United States Patent [19]

Scheithauer et al.

[11] 4,448,755

[45] May 15, 1984

[54] METHOD FOR REMOVAL OF TIN FROM AMMONIUM TUNGSTATES

[75] Inventors: Richard A. Scheithauer; Michael J. Miller; Martin B. MacInnis; James N. Christini, all of Towanda; Martin C. Vogt, Monroeton, all of Pa.

[73] Assignee: GTE Products Corporation, Stamford, Conn.

[21] Appl. No.: 557,021

[22] Filed: Dec. 1, 1983

[51] Int. Cl.$^3$ .............................................. C01G 41/00
[52] U.S. Cl. ....................................... 423/56; 423/54; 423/53; 423/58; 423/593
[58] Field of Search ................ 423/53, 58, 61, 593, 423/56

[56] References Cited

U.S. PATENT DOCUMENTS 1,431,559  10/1922  Becket ................................. 423/53
4,346,061  8/1982  Goddard ............................ 423/593

Primary Examiner—Herbert T. Carter
Attorney, Agent, or Firm—Robert E. Walter

[57] ABSTRACT

In a process for producing pure ammonium paratungstate from ammonium tungstate solutions containing tin, sulfide is added to the ammonium tungstate solution in an amount sufficient to form a soluble complex of the sulfide with the tin. The solution is then evaporated to a volume at which essentially all of the tungsten is in the form of insoluble ammonium paratungstate and essentially all of the tin is in the mother liquor in the form of a soluble complex along with other impurities. The solid ammonium paratungstate is then separated from the mother liquor by filtration.

7 Claims, No Drawings

METHOD FOR REMOVAL OF TIN FROM AMMONIUM TUNGSTATES

This invention relates to a process for producing pure ammonium paratungstate from ammonium tungstate solution containing tin as an impurity.

Tungsten ore concentrates are usually processed by either an acid process or an alkali process. In the alkali process, the tungsten is converted to sodium tungstate. This impure sodium tungstate solution is treated for removal of arsenic, phosphorus, silicon, and molybdenum by various methods. Tin is not removed by these methods, however, and remains with the sodium tungstate solution. After removal of these impurities, the pH of the solution is adjusted to 2.0 and it is used as the tungsten solvent extraction feed solution. Generally the tungsten concentration of the feed solution is from about 150 to 200 grams of $WO_3$/liter.

The solvent extraction system consists of a high molecular weight tertiary alkyl amine and kerosene. The feed solution is contacted with the organic and tungsten is extracted. Tin is also extracted into the organic. The tin is probably present in anionic form in the sodium tungstate solution since this solvent extraction system extracts only anions. Tungsten is stripped from the organic with a dilute aqueous solution of ammonium hydroxide. Since tin is also stripped, the resulting ammonium tungstate solution contains tin as an impurity. Upon evaporation of the ammonium tungstate solution, insoluble ammonium paratungstate is formed. The tin apparently also forms some insoluble substance since analysis of the ammonium paratungstate indicates that most of the tin present in the ammonium tungstate solution is contained in the ammonium paratungstate.

A process for treating the ammonium tungstate solutions so that the resulting ammonium paratungstate is pure with respect to tin would be an advancement in the art.

SUMMARY OF THE INVENTION

In accordance with one aspect of the invention, pure ammonium paratungstate is produced from ammonium tungstate solutions containing tin by a process in which a sulfide is added to the ammonium tungstate solution in an amount to form a soluble complex of the sulfide with tin. The resulting solution is then evaporated at about 70° C. to about 100° C. to a volume at which essentially all of the tungsten is in the form of insoluble ammonium paratungstate, and essentially all of the tin is in the mother liquor in the form of a soluble complex along with other impurities. The solid ammonium paratungstate is then separated from the mother liquor by filtration. If necessary, the solid ammonium paratungstate is then washed with sufficient water to remove the remaining tin and other impurities. The final ammonium paratungstate contains less than about 1.0 ppm Sn on a weight basis.

DETAILED DESCRIPTION OF THE INVENTION

For a better understanding of the present invention together with other and further objects, advantages, and capabilities thereof, reference is made to the following disclosure and appended claims in connection with the foregoing description of some of the aspects of the invention.

The ammonium tungstate solution can be any ammonium tungstate solution containing tin, but more typically is the stripping solution derived from contacting an aqueous solution of an ammonia bearing compound such as ammonium hydroxide with an organic solution in which the tungsten is complexed in an anionic form with a high molecular weight compound as a tertiary alkyl amine. Tin is also present in the organic solution probably as an anion since the alkyl amine complexes with anions. The tungsten and the tin are stripped by the ammonia bearing compound to form an ammonium tungstate solution containing tin. Generally such ammonium tungstate solutions contain from about 5 to about 50 ppm tin on a tungsten basis. To the resulting ammonium tungstate solution containing tin is added a sulfide in an amount sufficient to form a soluble complex with the tin. Generally from about 20 to about 400 parts of sulfide per part of tin is used, with about 200 to about 300 parts of sulfide per part of tin being preferred. The sulfide compound can be an aqueous solution of ammonium sulfide containing about 10% to about 21% of ammonium sulfide with about 18% to about 21% of ammonium sulfide being preferred. A typical charge is about 600 parts of 21% ammonium sulfide solution to about 1 parts of tin. The sulfide can also be in the form of hydrogen sulfide gas. The resulting ammonium tungstate solution containing the complexed tin is evaporated at a temperature of from about 70° C. to about 100° C. with about 80° C. to about 90° C. being preferred. The evaporation step allows for the removal of ammonia with the result being that the ammonium tungstate is converted to ammonium paratungstate which is insoluble in the given medium. Evaporation is carried out until the solution is at a volume at which about 10% to about 40% of the starting solution. The tungsten is then in the form of insoluble ammonium paratungstate, while at the same time the complexed tin and other impurities remain in the mother liquor. The final volume of the solution is from about 10% to about 40% of the initial volume with from about 20% to about 30% being preferred. The solid ammonium paratungstate is then separated from the mother liquor by various standard techniques such as filtration. The solid ammonium paratungstate in which is contained about 84% to about 92% of the original tungsten is then washed with sufficient water to remove any remaining tin and other impurities. About 0.1 to about 5 parts of water are used with about 0.5 to about 1.0 parts being preferred. The resulting solid ammonium paratungstate contains about 4.0 to about <1.0 ppm Sn on a tungsten basis.

To more fully illustrate this invention, the following examples are presented. All parts, portions, and percentages are on a weight basis unless otherwise stated.

EXAMPLE 1

About 250 parts of an ammonium tungstate solution containing about 5 ppm Sn on a tungsten basis is evaporated at about 80° C. to about 25% of its initial volume. The insoluble ammonium paratungstate which forms is separated from the mother liquor by filtration. The solid ammonium paratungstate is washed with 1.0 parts of water and then dried. Analysis of the dried ammonium paratungstate shows about 4.0 ppm Sn on a tungsten basis. About 250 parts of a similar ammonium tungstate solution used above is treated with 3.0 parts of an $(NH_4)_2S$ solution having a concentration of about 21%. The resulting mixture is evaporated to about 25% of the original volume of the starting ammonium tungstate solution. The solid ammonium paratungstate which forms is separated from the mother liquor by filtration. The solid ammonium paratungstate is washed with about 1.0 parts of water and then dried. The dried ammonium paratungstate contains less than about 0.7 ppm Sn on a tungsten basis.

EXAMPLE 2

Two similar ammonium tungstate solutions containing about 40 ppm Sn on a tungsten basis are subjected to the same procedure as described in Example 1. The untreated ammonium tungstate solution yielded an ammonium paratungstate containing 31 ppm tin on a tungsten basis. After treatment with $(NH_4)_2S$ (in accordance with Example 1) the ammonium tungstate then yielded an ammonium paratungstate containing less than about 1 ppm tin on a tungsten basis.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing pure ammonium paratungstate from ammonium tungstate solutions containing tin, said process comprising:

(a) adding a sulfide to said ammonium tungstate solutions to give an amount of a sulfide sufficient to form a complex with said tin,
   (b) evaporating the ammonium tungstate solution containing the complexed tin at a sufficient temperature and to a reduced volume sufficient to form a two phase system in which the solid phase contains essentially all of the tungsten as ammonium paratungstate, and the liquid phase contains a majority of the tin and
   (c) separating said solid phase from said liquid phase.

2. A process according to claim 1 wherein said ammonium paratungstate is washed with sufficient water to produce an ammonium paratungstate containing less than about 1.0 ppm Sn on a weight basis.

3. A process according to claim 1 wherein about 20 to about 400 parts of sulfide per part of tin are added to the ammonium tungstate solution.

4. A process according to claim 3 wherein the sulfide is ammonium sulfide.

5. A process according to claim 3 wherein the sulfide is hydrogen sulfide.

6. A process according to claim 1 wherein said ammonium tungstate solution containing the complexed tin is evaporated at from about 70° C. to about 100° C.

7. A process according to claim 1 wherein said ammonium tungstate solution containing the complexed tin is evaporated to a volume of from about 10% to about 40% of its original volume.

* * * * *